| (12) | United States Patent | (10) Patent No.: | US 9,684,977 B2 |
|---|---|---|---|
| | Ren | (45) Date of Patent: | Jun. 20, 2017 |

(54) METHOD AND APPARATUS FOR ROAD MAP RENDERING

(71) Applicant: Tencent Technology (Shenzhen) Company Limited, Shenzhen (CN)

(72) Inventor: Yafei Ren, Shenzhen (CN)

(73) Assignee: TENCENT TECHNOLOGY (SHENZHEN) COMPANY LIMITED, Shenzhen, Guangdong Province (CN)

( * ) Notice: Subject to any disclaimer, the term of this patent is extended or adjusted under 35 U.S.C. 154(b) by 60 days.

(21) Appl. No.: 14/750,882

(22) Filed: Jun. 25, 2015

(65) Prior Publication Data

US 2015/0371412 A1 Dec. 24, 2015

Related U.S. Application Data

(63) Continuation of application No. PCT/CN2013/084014, filed on Sep. 23, 2013.

(30) Foreign Application Priority Data

Dec. 26, 2012 (CN) .......................... 2012 1 0576275

(51) Int. Cl.
*G06T 17/00* (2006.01)
*G06T 11/00* (2006.01)
(Continued)

(52) U.S. Cl.
CPC ........ *G06T 11/001* (2013.01); *G06K 9/00476* (2013.01); *G06T 1/20* (2013.01);
(Continued)

(58) Field of Classification Search
None
See application file for complete search history.

(56) References Cited

FOREIGN PATENT DOCUMENTS

| CN | 102568011 A | 7/2012 |
| CN | 102610111 A | 7/2012 |

OTHER PUBLICATIONS

Hu Y et al., Method for implementing segmentation technology in graphics processing unit (GPU), involves generating bounding box coordinate and pre-generating segment number of segmentation,Dec. 7, 2011,CN 102270351 A.*

(Continued)

*Primary Examiner* — Martin Mushambo
(74) *Attorney, Agent, or Firm* — Morgan, Lewis & Bockius LLP

(57) ABSTRACT

A road map rendering method and associated computing apparatus are provided. The method includes: receiving data representing a road broken line, the data including multiple line segments and a road traffic condition; expanding the road broken line into a polygon based on the multiple line segments and creating a geometric-topological structure for the polygon using the received data, the geometric-topological structure including a vertex list and an index list; selecting texture coordinates that correspond to the road traffic condition; and filling the polygon using the selected texture coordinates that correspond to the road traffic condition. In the road map rendering method and associated computing apparatus provided in the embodiments of the present application, a road traffic condition is rendered by invoking a texture, so that performance of a graphics processing unit of a mobile terminal can be exploited and a good rendering effect can be achieved, thereby clearly indicating the road traffic condition.

15 Claims, 4 Drawing Sheets

(51) Int. Cl.
  *G06T 11/20* (2006.01)
  *G06K 9/00* (2006.01)
  *G06T 1/20* (2006.01)
  *G06T 11/60* (2006.01)
  *G06T 15/04* (2011.01)
  *G06T 17/10* (2006.01)
  *G06T 17/05* (2011.01)
  *G06T 11/40* (2006.01)
(52) U.S. Cl.
  CPC ............ *G06T 11/20* (2013.01); *G06T 11/203* (2013.01); *G06T 11/40* (2013.01); *G06T 11/60* (2013.01); *G06T 15/04* (2013.01); *G06T 17/05* (2013.01); *G06T 17/10* (2013.01)

(56) References Cited

OTHER PUBLICATIONS

Tencent Technology, ISRWO PCT/CN2013/084014, Dec. 26, 2013, 11 pgs.
Tencent Technology, IPRP, PCT/CN2013/084014, Jun. 30, 2015, 9 pgs.

\* cited by examiner

Road condition texture mapping

METHOD AND APPARATUS FOR ROAD MAP RENDERING

RELATED APPLICATIONS

This application is a continuation application of PCT Patent Application No. PCT/CN2013/084014, entitled "ROAD MAP RENDERING METHOD AND ROAD MAP RENDERING APPARATUS" filed on Sep. 23, 2013, which claims priority to Chinese Patent Application No. 201210576275.0, filed with the State Intellectual Property Office of the People's Republic of China on Dec. 26, 2012, and entitled "ROAD MAP RENDERING METHOD AND ROAD MAP RENDERING APPARATUS", both of which are incorporated herein by reference in their entirety.

FIELD OF THE TECHNOLOGY

The present application disclosed herein relates to the field of maps, and in particular, to method and associated computing apparatus for road map rendering.

BACKGROUND OF THE DISCLOSURE

At present, base map roads and real-time roads in maps are all rendered by using a conventional software manner in the industry. The specific steps include: 1) transforming a road line segment into a polygon zone; and 2) using a conventional polygon filling manner to perform filling.

In the conventional rendering manner, the visual effect is monotonous in color and the visual style shall be designed by a developer. In addition, rendering by using a software manner depends on a central processing unit (CPU) with respect to the speed and performance, and cannot fully utilize graphic rendering performance of a graphics processing unit (GPU).

SUMMARY

In view of this, embodiments of the present application provide a road map rendering method and associated computing apparatus, which aim to solve a problem existing in the conventional rendering manner that the visual effect is monotonous in color, and the rendering speed and performance depend on a CPU.

Therefore, an embodiment of the present application provides a road map rendering method, including: receiving data representing a road broken line, the data including multiple line segments and a road traffic condition; expanding the road broken line into a polygon based on the multiple line segments and creating a geometric-topological structure for the polygon using the received data, the geometric-topological structure including a vertex list and an index list; selecting texture coordinates that correspond to the road traffic condition; and filling the polygon using the selected texture coordinates that correspond to the road traffic condition.

In addition, another embodiment of the present application further provides a computing apparatus, comprising: a central processing unit, a graphic processing unit, memory, and a plurality of program units stored in the memory and to be executed by the CPU or GPU, respectively, the plurality of program unit further including: a broken line inputting unit, configured to receive data representing a road broken line, the data including multiple line segments and a road traffic condition; a topological structure creating unit, configured to expand the road broken line into a polygon based on the multiple line segments and create a geometric-topological structure using the received data, the geometric-topological structure including a vertex list and an index list; a texture coordinate association unit, configured to select texture coordinates that correspond to the road traffic condition; and a texture filling unit, configured to fill the polygon using the selected texture coordinates that correspond to the road traffic condition.

Still another embodiment of the present application further provides a non-transitory computer readable storage medium storing a computer program product comprising program instructions, which, when executed by a computing apparatus having a central processing unit (CPU) and a graphics processing unit (GPU), causes the computing apparatus to perform the steps of the foregoing road map rendering method.

According to the road map rendering method and associated computing apparatus, and the computer program product provided in the embodiments of the present application, a road traffic condition is rendered by invoking a texture, so that GPU performance of a mobile terminal can be fully exploited and a good rendering effect can be achieved, thereby clearly indicating the road traffic condition.

BRIEF DESCRIPTION OF THE DRAWINGS

The embodiments of the present application are described in detail below with reference to the accompanying drawings, and these and/or other aspects and advantages of the present disclosure will become clearer and more understandable, where.

DESCRIPTION OF EMBODIMENTS

The embodiments of the present application are further described below in detail with reference to the accompanying drawings and embodiments. It should be understood that, the embodiments described herein are merely some of the embodiments of the present application rather than all of the embodiments. All other embodiments obtained by a person of ordinary skill in the art based on the embodiments of the present application without creative efforts shall fall within the protection scope of the present disclosure.

It should be noted that, the embodiments of the present application provide improvement of a method and an apparatus for rendering a road traffic condition in a map on basis of an Open Graphics Library (OpenGL).

The OpenGL is a specification defining a cross-language, cross-platform programming interface, and can be used in both 2D images and 3D images. As a professional graphic program interface, the OpenGL is a low-level graphics library that has a powerful function and can be invoked conveniently.

The OpenGL acts as a rendering standard for 3D graphics, and specific functions of the OpenGL are implemented by a graphics card driver. Therefore, a graphic program developed on basis of the OpenGL can finally achieve automatic detection and adaptation by using the graphics card driver, so as to fully utilize rendering performance of a GPU.

Embodiment 1

Figure 1:
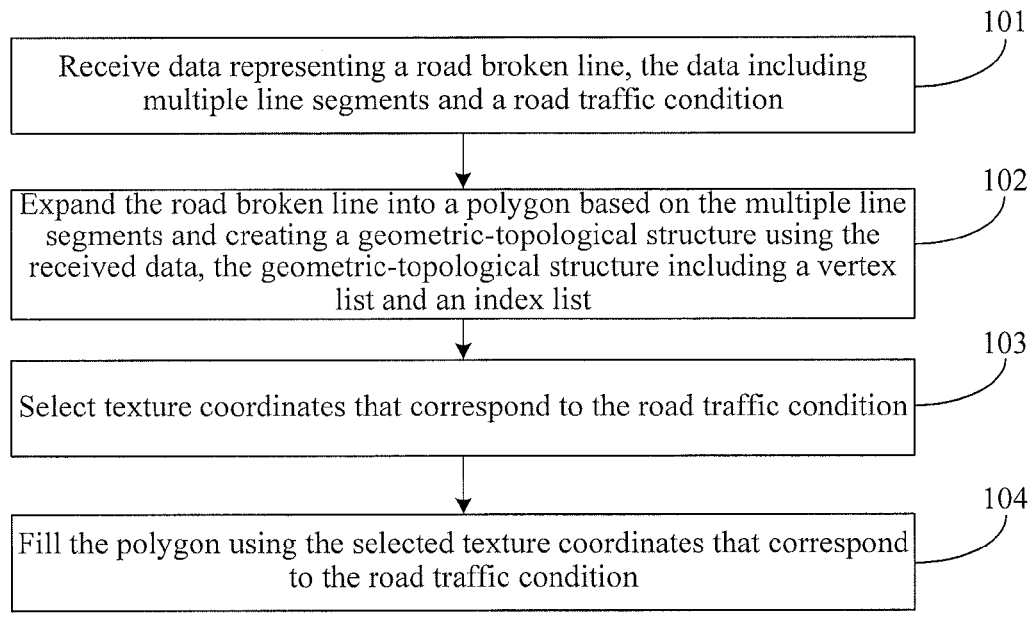
FIG. 1 is a flowchart of a road map rendering method according to a first embodiment of the present application.

FIG. 1 is a flowchart of a road map rendering method according to a first embodiment of the present application, which includes step 101 to step 104.

Step 101: Receive data representing a road broken line, the data including multiple line segments and a road traffic condition.

Step 102: Expand the road broken line into a polygon based on the multiple line segments and creating a geometric-topological structure for the polygon using the received data, the geometric-topological structure including a vertex list and an index list.

Step 103: Select texture coordinates that correspond to the road traffic condition.

Step 104: Fill the polygon using the selected texture coordinates that correspond to the road traffic condition.

Referring to FIG. 2 to FIG. 5, the foregoing method is described below with reference to specific implementation manners.

Figure 2:
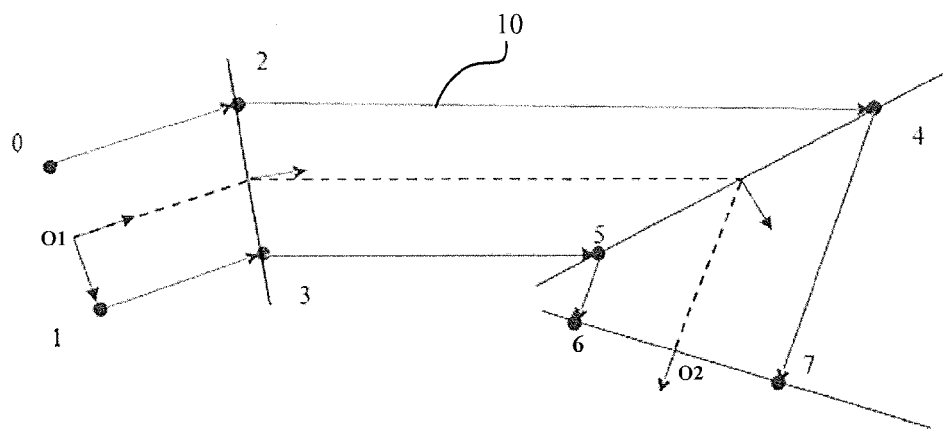
FIG. 2 is a schematic diagram of a topological structure created in step 102 as shown in FIG. 1.

As shown in FIG. 2, in step 101, the road broken line may be input according to road coordinates.

In FIG. 2, a dotted line O1O2 is an input road broken line, and a topological structure 10 is created on basis of the road broken line O1O2, where the topological structure 10 has a vertex list and an index list. The vertex list and the index list are in data input formats prescribed by the OpenGL. The index list is used for representing all triangular surface patches of a model that is drawn, where each number represents a vertex at a corresponding position in the vertex list, every three numbers are included in a group to represent a triangle, and a vertex sequence of the triangle is constructed in an anti-clockwise direction. According to a specific example of the present disclosure as shown in FIG. 2, the vertex list is {0,1,2,3,4,5,6,7}, and an index list of the topological structure 10 includes an index sequence of six triangles, namely, {0,1,2; 1,3,2; 2,3,4; 3,5,4; 4,5,6; 4,6,7}. The "triangle" herein does not constitute a limitation on the scope of the present disclosure, and a polygon with more sides may be divided and transformed into a series of triangles.

Figure 3:
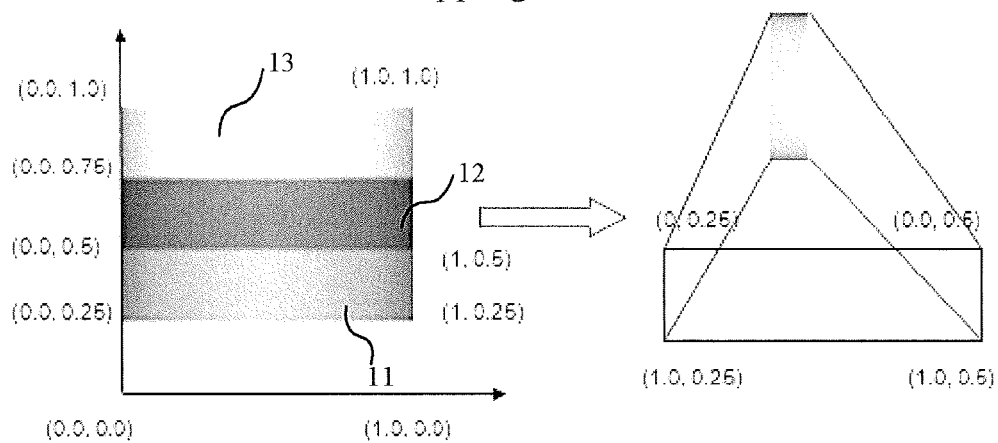
FIG. 3 is a schematic diagram of three types of texture coordinates according to an embodiment of step 103 as shown in FIG. 1.

Referring to FIG. 3, in step 103, three types of texture coordinates that correspond to road traffic conditions are selected. The road traffic conditions include traffic congestion, traffic clear, and traffic slow. The step of selecting three types of texture coordinates that correspond to road traffic conditions includes: selecting a first texture segment that corresponds to a traffic congestion zone, a second texture segment that corresponds to a traffic clear zone, and a third texture segment that corresponds to a traffic slow zone, wherein each texture segment has a unique color and a unique set of texture coordinates; and applying one of the three types of texture coordinates that corresponds to the road traffic condition to the polygon associated with a corresponding line segment. For example, a texture segment 12 is cut out for the traffic congestion zone, a texture segment 11 is cut out for the traffic clear zone, and a texture segment 13 is cut for the traffic slow zone. According to an example of the present disclosure, the texture segment 12 may be red, the texture segment 11 may be green, and the texture segment 13 may be yellow. The foregoing selection of colors does not constitute a limitation on the scope of the present disclosure. A person skilled in the art may select any suitable color for a different road traffic condition.

In FIG. 3, a texture coordinate system is on the left, where a horizontal axis is an s-axis, and a vertical axis is a t-axis. All texture coordinates (s, t) of the whole picture fall in a range of [0,1]. The picture includes four rectangular areas having an identical size and an s-coordinate range of [0,1], where a white texture segment has a t-coordinate range of [0, 0.25], a green texture segment has a t-coordinate range of [0.25,0.5], a red texture segment has a t-coordinate range of [0.5, 0.75], and a yellow texture segment has a t-coordinate range of [0.75,1].

Figure 4:
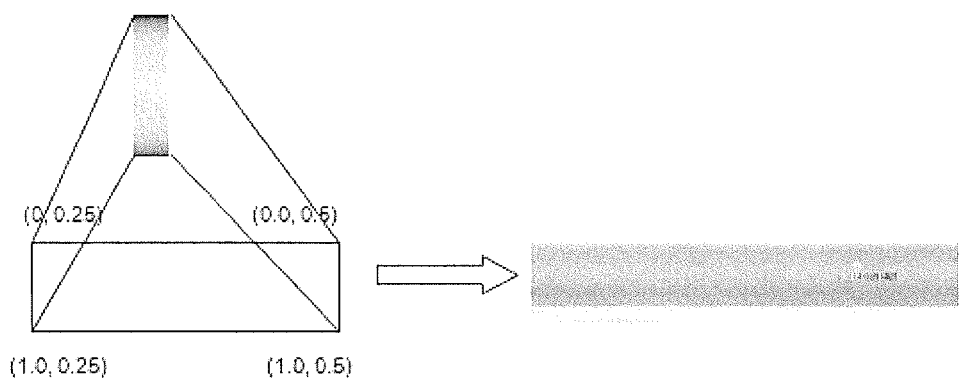
FIG. 4 is a schematic diagram of invoking an OpenGL function to perform texture filling on a polygon in a road map rendering method according to some embodiments of the present disclosure.

On the right side of FIG. 3, a rectangle on a bottom surface of a three-dimensional trapezoid is a basic road section. Four vertexes of the rectangular basic road section are respectively allocated with texture coordinates (0, 0.25), (1, 0.25), (0, 0.5), and (1, 0.5). A top surface of the three-dimensional trapezoid is a green segment 11 cut out by the OpenGL from the picture by using texture coordinates of a polygon of the road section. As shown in FIG. 4, the OpenGL maps the green texture segment on the road section, thereby achieving a three-dimensional display effect of the road section.

The road traffic condition is rendered by causing a graphics processing unit to invoke an OpenGL function, and therefore a texture segment representing a clear road as shown in FIG. 4 may be filled in any of the foregoing index sequences {0,1,2; 1,3,2; 2,3,4; 3,5,4; 4,5,6; 4,6,7}, for example, being selectively filled in {0,1,2; 1,3,2}, and the like, which is not limited to specific embodiments.

The road map rendering method provided in this embodiment of the present application has the following advantages: because a road traffic condition is rendered by using an OpenGL texture through GPU, so that GPU performance of a mobile terminal can be fully exploited and a good rendering effect can be achieved, thereby clearly indicating the road traffic condition.

Figure 5:
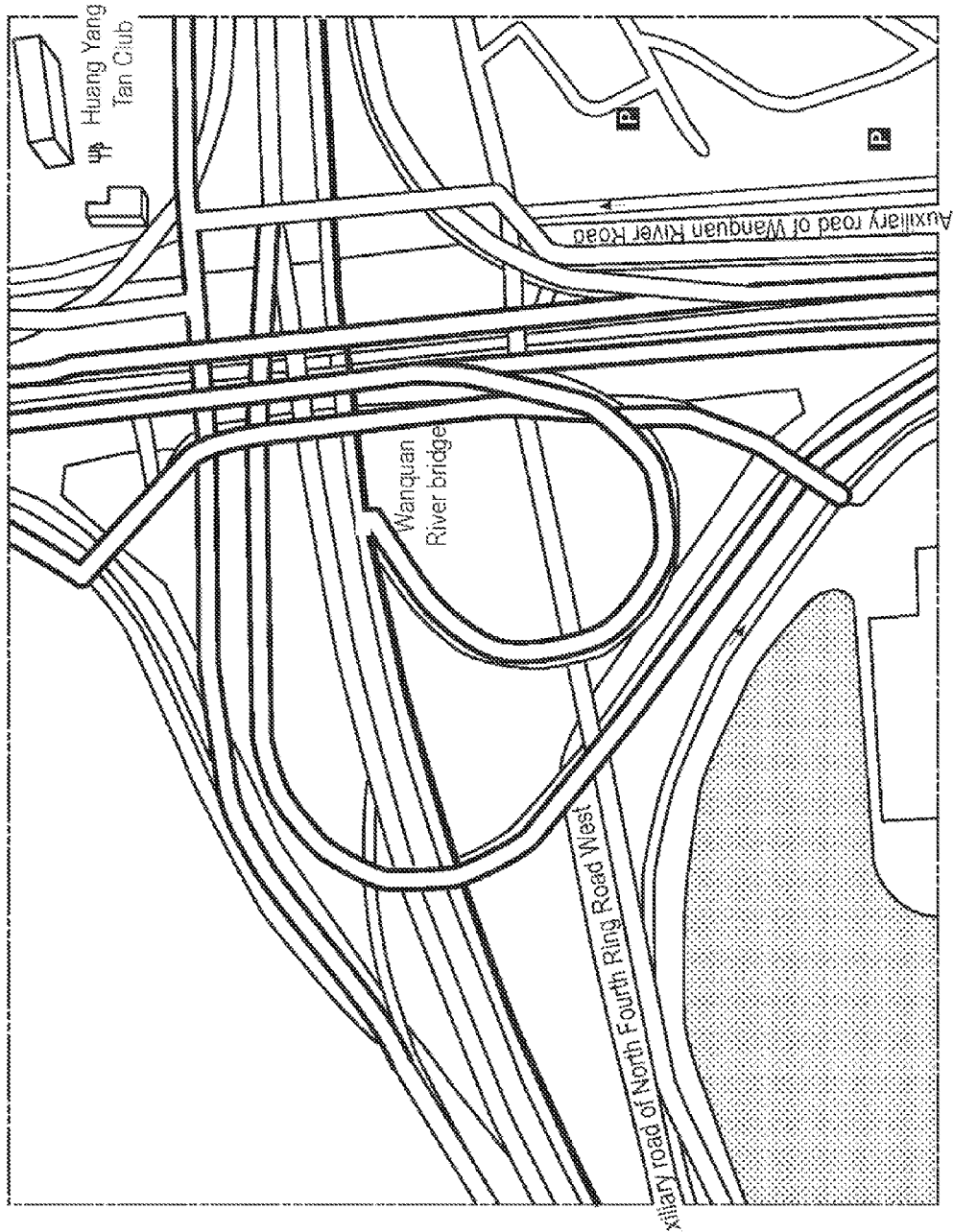
FIG. 5 is a schematic diagram of a map that has been rendered by using a road map rendering method according to some embodiments of the present disclosure.

As shown in FIG. 5, after being filled with textures, the whole road takes on a pipeline effect, the colors are more easily distinguished, and road intersections have a stronger three-dimension effect. Therefore, modifying a road style can be achieved by alteration of texture mapping, so that adjustment of a visual road style can be implemented completely by an art designer.

Embodiment 2

Figure 6:
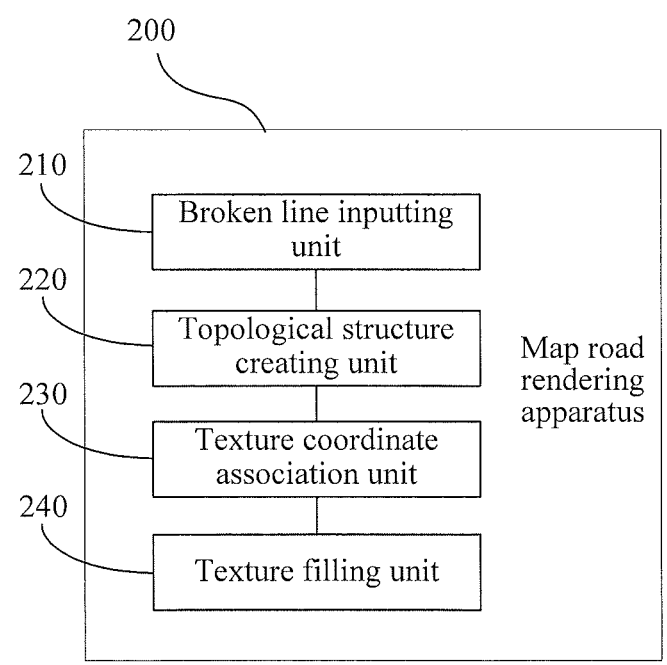
FIG. 6 is a structural diagram of a road map rendering apparatus according to a second embodiment of the present application.

Referring to FIG. 6, a road map rendering apparatus 200 provided in a second embodiment of the present application includes a central processing unit, a graphics processing unit and memory for storing a plurality of program units such as a broken line inputting unit 210, a topological structure creating unit 220, a texture coordinate association unit 230, and a texture filling unit 240.

The broken line inputting unit 210 is configured to receive data representing a road broken line, the data including multiple line segments and a road traffic condition.

The topological structure creating unit 220 is configured to expand the road broken line into a polygon based on the multiple line segments and create a geometric-topological structure using the received data, the geometric-topological structure including a vertex list and an index list.

The texture coordinate association unit 230 is configured to select texture coordinates that correspond to the road traffic condition.

The texture filling unit 240 is configured to fill the polygon using the selected texture coordinates that correspond to the road traffic condition.

In this embodiment, the texture coordinate association unit 230 is configured to select three types of texture coordinates that correspond to road traffic conditions, where the road traffic conditions include traffic congestion, traffic clear and traffic slow. The step of selecting three types of texture coordinates that correspond to road traffic conditions includes selecting a texture segment that corresponds to a traffic congestion zone, a texture segment that corresponds to a traffic clear zone, and a texture segment that corresponds to a traffic slow zone, where various texture segments can be marked with different colors. For example, a texture segment 12 is cut out for the traffic congestion zone, a texture segment 11 is cut out for the traffic clear zone, and a texture segment 13 is cut for the traffic slow zone. According to an example of the present disclosure, if a red section represents traffic congestion, a green section represents traffic clear, and a yellow section represents traffic slow, the selecting three types of texture coordinates that correspond to road traffic conditions may respectively be: cutting out a red texture segment for the traffic congestion zone, a green texture segment for the traffic clear zone, and a yellow texture segment for the traffic slow zone. The foregoing selection of colors does not constitute a limitation on the scope of the present disclosure. A person skilled in the art may select any suitable color for a different road traffic condition.

In addition, the texture filling unit 240 is configured to cause the GPU to invoke an OpenGL function to perform texture filling on the polygon.

The road map rendering apparatus 200 provided in this embodiment of the present application has the following advantages: because a road traffic condition is rendered through invoking a texture by using an OpenGL through the GPU, so that GPU performance of a mobile terminal can be fully exploited and a good rendering effect can be achieved, thereby clearly indicating the road traffic condition.

The apparatus 200 according to this embodiment of the present application has the same conception and principle as the method of the aforementioned first embodiment. Therefore, the content in the second embodiment similar to that in the first embodiment is not described in detail again.

It can be understood by a person skilled in the art that, the units in the apparatus of the embodiment may be distributed in the apparatus of the embodiment according to a manner as described in the embodiment, and may also be changed correspondingly to be located in one or more apparatuses which are different from this embodiment. All the units of the above embodiment can be combined into a unit, and can also be further divided into multiple subunits.

Through the above description of the implementation manners, a person skilled in the art can clearly understand that, the aspects of the present disclosure may be achieved in a manner of combining software and a necessary common hardware platform, and certainly may also be achieved by hardware. However, in most cases, the former is a better implementation manner. Based on such understanding, the technical solutions of the aspects of the present disclosure can be reflected in a form of a software product. The computer software product is stored in a storage medium, includes several instructions, and is configured to make a terminal device (which may be a mobile phone, a personal computer, a server, a network device, or the like) execute the method described in the embodiments of the present application.

The above descriptions are merely various embodiments of the present application, but are not intended to limit the patent scope of the present disclosure. Any equivalent structure or flow transformation made with reference to the specification and accompanying drawings of this application, or direct or indirect applications thereof in other relevant technical fields, shall also fall within the patent protection scope of the present disclosure.

What is claimed is:

1. A road map rendering method, comprising:
at a computing device having a central processing unit (CPU) and a graphic processing unit (GPU) and memory for storing program units to be executed by the CPU or GPU, respectively:
at the CPU:
receiving data representing a road broken line, the data including multiple line segments and a road traffic condition;
expanding the road broken line into a polygon based on the multiple line segments and creating a geometric-topological structure for the polygon using the received data, the geometric-topological structure including a vertex list and an index list;
selecting texture coordinates that correspond to the road traffic condition; and
at the GPU:
filling the polygon using the selected texture coordinates that correspond to the road traffic condition, wherein, after being filled with textures, the road map has a pipeline-like three-dimensional effect at both sides of the road map.

2. The road map rendering method according to claim 1, wherein the step of selecting texture coordinates that correspond to the road traffic condition further comprises:
selecting a first texture segment that corresponds to a traffic congestion zone, a second texture segment that corresponds to a traffic clear zone, and a third texture segment that corresponds to a traffic slow zone, wherein each texture segment has a unique color and a unique set of texture coordinates; and
applying one of the three types of texture coordinates that corresponds to the road traffic condition to the polygon associated with a corresponding line segment.

3. The road map rendering method according to claim 1, wherein the step of filling the polygon using the selected texture coordinates that correspond to the road traffic condition further comprises:
causing the GPU to invoke an OpenGL function to perform the texture filling on the polygon.

4. The road map rendering method according to claim 1, wherein the vertex list includes a set of labels, each label corresponding to a unique vertex of the polygon, and the index list includes multiple sequences of labels from the vertex list, each sequence of labels defining a unique portion of the polygon.

5. The road map rendering method according to claim 4, wherein each sequence of labels defines a triangle of the polygon and a union of the triangles associated with the index list is the polygon.

6. A computing apparatus, comprising:
a central processing unit (CPU);
a graphic processing unit (GPU);
memory; and a plurality of program units stored in the memory and to be executed by the CPU or GPU, respectively, the plurality of program unit further including:
  a broken line inputting unit, configured to receive data representing a road broken line, the data including multiple line segments and a road traffic condition;
  a topological structure creating unit, configured to expand the road broken line into a polygon based on the multiple line segments and create a geometric-topological structure using the received data, the geometric-topological structure including a vertex list and an index list;
  a texture coordinate association unit, configured to select texture coordinates that correspond to the road traffic condition; and
  a texture filling unit, configured to fill the polygon using the selected texture coordinates that correspond to the road traffic condition, wherein, after being filled with textures, the road map has a pipeline-like three-dimensional effect at both sides of the road map.

7. The computing apparatus according to claim 6, wherein the texture coordinate association unit is configured to:
  select a first texture segment that corresponds to a traffic congestion zone, a second texture segment that corresponds to a traffic clear zone, and a third texture segment that corresponds to a traffic slow zone, wherein each texture segment has a unique color and a unique set of texture coordinates; and
  apply one of the three types of texture coordinates that corresponds to the road traffic condition to the polygon associated with a corresponding line segment.

8. The computing apparatus according to claim 6, wherein the texture filling unit is configured to cause the GPU to invoke an OpenGL function to perform the texture filling on the polygon.

9. The computing apparatus according to claim 6, wherein the vertex list includes a set of labels, each label corresponding to a unique vertex of the polygon, and the index list includes multiple sequences of labels from the vertex list, each sequence of labels defining a unique portion of the polygon.

10. The computing apparatus according to claim 9, wherein each sequence of labels defines a triangle of the polygon and a union of the triangles associated with the index list is the polygon.

11. A non-transitory computer readable storage medium storing a computer program product comprising program instructions, which, when executed by a computing apparatus having a central processing unit (CPU) and a graphics processing unit (GPU), causes the computing apparatus to perform the following steps for rendering a road map:
  at the CPU:
    receiving data representing a road broken line, the data including multiple line segments and a road traffic condition;
    expanding the road broken line into a polygon based on the multiple line segments and creating a geometric-topological structure for the polygon using the received data, the geometric-topological structure including a vertex list and an index list;
    selecting texture coordinates that correspond to the road traffic condition; and
  at the GPU:
    filling the polygon using the selected texture coordinates that correspond to the road traffic condition, wherein, after being filled with textures, the road map has a pipeline-like three-dimensional effect at both sides of the road map.

12. The non-transitory computer readable storage medium according to claim 11, wherein the step of selecting texture coordinates that correspond to the road traffic condition further comprises:
  selecting a first texture segment that corresponds to a traffic congestion zone, a second texture segment that corresponds to a traffic clear zone, and a third texture segment that corresponds to a traffic slow zone, wherein each texture segment has a unique color and a unique set of texture coordinates; and
  applying one of the three types of texture coordinates that corresponds to the road traffic condition to the polygon associated with a corresponding line segment.

13. The non-transitory computer readable storage medium according to claim 11, wherein the step of filling the polygon using the selected texture coordinates that correspond to the road traffic condition further comprises:
  causing the GPU to invoke an OpenGL function to perform the texture filling on the polygon.

14. The non-transitory computer readable storage medium according to claim 11, wherein the vertex list includes a set of labels, each label corresponding to a unique vertex of the polygon, and the index list includes multiple sequences of labels from the vertex list, each sequence of labels defining a unique portion of the polygon.

15. The non-transitory computer readable storage medium according to claim 14, wherein each sequence of labels defines a triangle of the polygon and a union of the triangles associated with the index list is the polygon.

* * * * *